United States Patent
Zhao et al.

(10) Patent No.: US 11,880,241 B2
(45) Date of Patent: Jan. 23, 2024

(54) FLEXIBLE DISPLAY PANEL AND FLEXIBLE DISPLAY APPARATUS

(71) Applicant: Yungu (Gu'an) Technology Co., Ltd., Hebei (CN)

(72) Inventors: Yongfeng Zhao, Kunshan (CN); Qi Shan, Kunshan (CN); Zhaoji Zhu, Kunshan (CN); Fu Liao, Kunshan (CN); Bo Zhang, Kunshan (CN); Fan Dong, Kunshan (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 321 days.

(21) Appl. No.: 17/520,026

(22) Filed: Nov. 5, 2021

(65) Prior Publication Data
US 2022/0058993 A1   Feb. 24, 2022

Related U.S. Application Data (63) Continuation of application No. PCT/CN2020/096894, filed on Jun. 18, 2020.

(30) Foreign Application Priority Data

Oct. 31, 2019   (CN) .......................... 201911054131.7

(51) Int. Cl.
*G06F 1/16* (2006.01)
*H04M 1/02* (2006.01)
(Continued)

(52) U.S. Cl.
CPC ........ *G06F 1/1652* (2013.01); *H04M 1/0268* (2013.01); *G09F 9/301* (2013.01); *H05B 3/34* (2013.01)

(58) Field of Classification Search
CPC ......... G06F 1/1652; H05B 3/34; G09F 9/301; H04M 1/0268
See application file for complete search history.

(56) References Cited

U.S. PATENT DOCUMENTS 9,348,450 B1    5/2016  Kim
2014/0321073 A1*  10/2014  Hong .................... G06F 1/1652
                                                    335/289

(Continued)

FOREIGN PATENT DOCUMENTS

CN        204045140 U      12/2014
CN        104751739 A      7/2015
(Continued)

OTHER PUBLICATIONS

International Search Report dated Sep. 22, 2020 in corresponding International Application No. PCT/CN2020/096894; 6 pages.

(Continued)

*Primary Examiner* — Nidhi Thaker
(74) *Attorney, Agent, or Firm* — Maier & Maier, PLLC (57) ABSTRACT

A flexible display panel and a flexible display apparatus. The flexible display panel includes a display panel body having a bent region and non-bent regions, and a flexible support layer attached to the shady surface of the bent region, the flexible support layer includes a flexible base and a heating layer, a plurality of magnetic balls are provided in the flexible base; where the heating layer is provided on the flexible base for heating the plurality of magnetic balls, the plurality of magnetic balls are expanded with heat to enable the hardness of the flexible support layer when the display panel body is in an unfolded state to be greater than the hardness of the flexible support layer when the display panel (Continued)

body is in a bent state. The flexible display panel will not be wrinkled during the bending and unfolding process, and has an improved display effect.

18 Claims, 4 Drawing Sheets

(51) Int. Cl.
  *G09F 9/30* (2006.01)
  *H05B 3/34* (2006.01)

(56) References Cited

U.S. PATENT DOCUMENTS

| | | | |
|---|---|---|---|
| 2016/0212890 A1 | 7/2016 | Jeong et al. | |
| 2018/0364764 A1* | 12/2018 | Lin | H04M 1/0268 |
| 2019/0166696 A1* | 5/2019 | Lin | G09F 9/301 |
| 2019/0204879 A1 | 7/2019 | Park et al. | |
| 2019/0286195 A1 | 9/2019 | Lin | |
| 2019/0361494 A1* | 11/2019 | Wu | H04M 1/0268 |
| 2021/0366319 A1* | 11/2021 | Feng | G09F 9/301 |
| 2023/0045043 A1* | 2/2023 | Fan | H04M 1/0268 |

FOREIGN PATENT DOCUMENTS

| | | | | |
|---|---|---|---|---|
| CN | 106125846 A | | 11/2016 | |
| CN | 106131251 A | | 11/2016 | |
| CN | 106205385 A | | 12/2016 | |
| CN | 106328681 A | | 1/2017 | |
| CN | 206505922 U | | 9/2017 | |
| CN | 108831301 A | | 11/2018 | |
| CN | 108953864 A | | 12/2018 | |
| CN | 109087588 A | | 12/2018 | |
| CN | 109118964 A | * | 1/2019 | |
| CN | 109118964 A | | 1/2019 | |
| CN | 109427980 A | | 3/2019 | |
| CN | 109461385 A | * | 3/2019 | G09F 9/301 |
| CN | 109461385 A | | 3/2019 | |
| CN | 109493737 A | | 3/2019 | |
| CN | 208596507 U | | 3/2019 | |
| CN | 208622359 U | | 3/2019 | |
| CN | 109584719 A | | 4/2019 | |
| CN | 109584719 A | * | 4/2019 | G06F 1/1616 |
| CN | 208806014 U | | 4/2019 | |
| CN | 109859634 A | | 6/2019 | |
| CN | 109887414 A | | 6/2019 | |
| CN | 110085640 A | | 8/2019 | |
| CN | 110211501 A | | 9/2019 | |
| CN | 110265438 A | | 9/2019 | |
| CN | 110288912 A | * | 9/2019 | G09F 9/301 |
| CN | 110288912 A | | 9/2019 | |
| CN | 209461082 U | | 10/2019 | |
| CN | 209461082 U | * | 10/2019 | |
| CN | 110599913 A | | 12/2019 | |
| JP | 2008-177007 A | | 7/2008 | |
| KR | 20110100936 A | | 9/2011 | |
| KR | 1020180131143 A | | 12/2018 | |
| WO | 2019/177427 A2 | | 9/2019 | |

OTHER PUBLICATIONS

First Office Action dated Jan. 4, 2021 in corresponding Chinese Application No. 201911054131.7; 17 pages.
Second Office Action dated Jul. 21, 2021 in corresponding Chinese Application No. 201911054131.7; 22 pages.
Office Action dated Jan. 6, 2022, in connection with corresponding Chinese Application No. 201911054131.7(7 pp., including machine-generated English translation).
Zhou., "The Study of Spacer Structures in Field Emission Flat Displays"; Apr. 15, 2009; 76 pages with English Abstract.
Ma et al., "Thin Film Transistors For Foldable Displays"; Department of Electrical Engineering, Princeton University, IEDM; 1997; pp. 1-4.

* cited by examiner

FLEXIBLE DISPLAY PANEL AND FLEXIBLE DISPLAY APPARATUS

CROSS-REFERENCE TO RELATED APPLICATIONS

This application is a continuation of International Application No. PCT/CN2020/096894, filed on Jun. 18, 2020, which claims priority to Chinese Patent Application No. 201911054131.7, filed on Oct. 31, 2019. Both of the above applications are hereby incorporated by reference in their entireties.

TECHNICAL FIELD

The present disclosure relates to the technical field of display, and in particular to a flexible display panel and a flexible display apparatus.

BACKGROUND

Flexible display panels are widely used in various electronic devices, such as mobile phones and tablet computers, due to their advantages of low energy consumption, wide viewing angle, fast response speed, and bendable display, etc.

A flexible display panel usually includes a bent region and two non-bent regions located on both sides of the bent region. The two non-bent regions can be flipped relative to the bent region, to make the flexible display panel realize the function of unfolding or bending.

When the above-mentioned flexible display panel is applied to a flexible display apparatus, it is generally necessary to provide, on the back of the non-bent regions, two support plates for supporting the two non-bent regions and to provide a mechanical connecting portion on the surface of the bent area, where the mechanical connecting portion is respectively connected with the two support plates, and there is a certain gap between the mechanical connecting portion and the bent region. During the bending process of the flexible display apparatus, the mechanical connecting portion serves as a rotating shaft; during the unfolding process of the flexible display apparatus, the mechanical connecting portion serves as a support component to support the flexible display panel to realize the unfolding of the flexible display apparatus.

However, in the process of bending and unfolding, a relative slide between the mechanical connecting portion and the flexible display panel will be formed, which causes the flexible display panel to wrinkle, thereby reducing the display effect of the flexible display panel.

SUMMARY

The embodiments of the present disclosure provide a flexible display panel and a flexible display apparatus to solve the technical problem in the prior art that the display effect of the flexible display panel is reduced due to wrinkles generated in the bending and unfolding process of the flexible display panel.

In order to achieve the foregoing objective, the embodiments of the present disclosure adopt the following technical solutions:

In one aspect, an embodiment of the present disclosure provides a flexible display panel including a display panel body and a flexible support layer, where the display panel body includes a bent region and a non-bent region connected to the bent region; the flexible support layer is attached to a shady surface of the bent region, the flexible support layer includes a flexible base and a heating layer, and a plurality of accommodating slots are provided in the flexible base, and each of the accommodating slots is provided with one of the magnetic balls; where a heating layer is provided on the flexible base, the heating layer is configured to heat the magnetic balls when the display panel body is in the unfolding state, and each of the magnetic balls expands with heat to enable a hardness of the flexible support layer when the display panel body is in an unfolded state to be greater than a hardness of the flexible support layer when the display panel body is in a bent state.

In another aspect, an embodiment of the present disclosure provides a flexible display apparatus, including the flexible display panel as described above, and a first housing and a second housing provided on the shady surface of the flexible display panel, where there is a gap between the first housing and the second housing, and the gap is configured to accommodate the flexible support layer.

In the flexible display panel provided by the embodiments of the present disclosure, a flexible support layer is attached to the shady surface of the bent region, so that the flexible support layer and the display panel body form an integral part. The distance between adjacent magnetic balls is relatively large at room temperature, and the flexible support layer is relatively soft in hardness, which does not affect the bending of the display panel body. When the flexible display panel is unfolded, the heating layer heats the magnetic balls, and each of the magnetic balls expands with heat to enable the hardness of the flexible support layer at this time to be greater than the hardness of the flexible support layer when the display panel body is in the bent state. The flexible support layer is used to provide support force for the bent region, so that the display panel body can be flattened. At the same time, since the flexible support layer is arranged to attach to the display panel body, the two will not slide relative to each other during the bending and unfolding process, so that the surface of the flexible display panel is always in a flat state to avoid wrinkles of the flexible display panel, thereby improving the display effect of the flexible display panel.

In addition to the technical problem solved by the embodiments of the present disclosure described above, the technical features constituting the technical solutions and the beneficial effects produced by the technical features of these technical solutions, other technical problems solved by the flexible display panel and the flexible display apparatus provided by the embodiments of the present disclosure, other technical features included in the technical solutions and the beneficial effects produced by these technical features will be further described in detail in the embodiments.

DETAILED DESCRIPTION OF THE EMBODIMENTS

In order to make the purpose, technical solutions and advantages of embodiments of the present disclosure clearer, the technical solutions in the embodiments of the present disclosure will be described as follows clearly and comprehensively in conjunction with accompanying drawings in the embodiments of the present disclosure. Apparently, the described embodiments are a part rather than all of the embodiments of the present disclosure.

The flexible display panel usually includes a bent region and a non-bent region connected to the bent region. The non-bent regions can be flipped relative to the bent region, to enable the flexible display panel to be unfolded or bent. In the same flexible display panel, at least one bent region and at least one non-bent region may be included. For example, the flexible display panel includes one bent region and two non-bent regions.

Since the flexible display panel is relatively soft, it is usually necessary to provide a support component on the shady surface of the flexible display panel. For example, a first housing is provided in one of the non-bent regions, and a second housing is provided in the other one of the non-bent regions. The first housing and the second housing are connected by a mechanical connecting portion, and the mechanical connecting portion is located on the shady surface of the bent region. During the bending process of the flexible display panel, the mechanical connecting portion serves as a rotating shaft; during the unfolding process of the flexible display panel, the mechanical connecting portion serves as the support component to support the flexible display panel to realize the flattening of the flexible display panel.

There is a certain gap between the mechanical connecting portion and the bent region. In the process of bending and unfolding of the flexible display panel, a relative slide occurs between the mechanical connecting portion and the flexible display panel, so that the mechanical connecting portion touches the flexible display panel, causing the flexible display panel to wrinkle, thereby reducing the display effect of the flexible display panel.

In light of the above-mentioned problem, an embodiment of the present disclosure provides a flexible display panel. By arranging a flexible support layer on the shady surface of the bent region, the flexible support layer performs as a rotating shaft and has a function of supporting at the same time, no additional mechanical connecting portion is required, at the same time, the wrinkles of the flexible display panel are avoided, and the display effect of the flexible display panel is improved.

The flexible display panel and the flexible display apparatus provided by this embodiment will be described in detail below with reference to the accompanying drawings.

Please refer to FIGS. 1 to 7, an embodiment of the present disclosure provides a flexible display panel, which includes a display panel body 10 and a flexible support layer 20. The display panel body 10 may include a bent region 101 and a non-bent region 102 connected to the bent region 101. The flexible support layer 20 is attached to the shady surface of the bent region 101. The flexible support layer 20 includes a flexible base and a heating layer 202. A plurality of accommodating slots 30 are provided in the flexible base, and each of the accommodating slots 30 is provided with a magnetic ball 201. The heating layer 202 is provided on the flexible base, when the display panel body is in the unfolded state, the heating layer 202 is configured to heat each magnetic ball 201, and each magnetic ball 201 expands with heat to enable the hardness of the flexible support layer 20 when the display panel body 10 is in an unfolded state to be greater than the hardness of the flexible support layer 20 when the display panel body 10 is in a bent state.

During use, the non-bent regions 102 can be rotated relative to the bent region 101 to bend or unfold the flexible display panel. The size ratio of the bent region 101 to the non-bent region 102 can be designed according to the size of the product, which is not specifically limited in this embodiment.

The display panel body 10 may include a substrate, an anode layer, a hole injection layer, a hole transport layer, a light emitting layer, an electron transport layer, an electron injection layer, and a cathode layer, which are in a sequentially stacked arrangement. The substrate is used as a bearing component of the flexible display panel to support devices arranged thereon, and its material may be a flexible substrate, such as a polyimide substrate. In addition, the cathode layer is used to generate electrons. The electrons enter the light-emitting layer through the electron injection layer and the electron transport layer. The anode layer is used to generate holes, and the holes enter the light-emitting layer through the hole transport layer and the hole injection layer. The electrons and the holes recombine and emit light in the light-emitting layer.

In this embodiment, the shady side refers to a side of the substrate away from the light-emitting layer, that is, the bottom surface of the substrate.

The flexible support layer 20 is arranged on the shady surface of the bent region 101. The flexible support layer 20 has the functions of rotation and support at the same time. The flexible support layer 20 can be adhered to the shady surface of the bent region 101 by an adhesive so that the upper surface of the flexible support layer 20 is attached to the lower surface of the bent region 101. The size of the flexible support layer 20 is the same as or substantially the same as the size of the bent region 101, and is used to support the bent region 101.

When the flexible display panel is in a bent state, the hardness of the flexible support layer 20 is small, so that the hardness of the flexible support layer 20 is less than the hardness of the display panel body 10, and the flexible support layer 20 performs as a rotating component. At this time, the non-bent regions 102 can be flipped relative to the bent region 101. When the flexible display panel is in the unfolded state, the hardness of the flexible support layer 20 increases, so that the hardness of the flexible support layer 20 is greater than the hardness of the flexible support layer 20 when the display panel body 10 is in the bent state. The flexible support layer 20 provides support force to the bent region 101. When a user touches the display panel body 10, the display panel body 10 does not dent, which improves the display effect of the flexible display panel.

Figure 1:
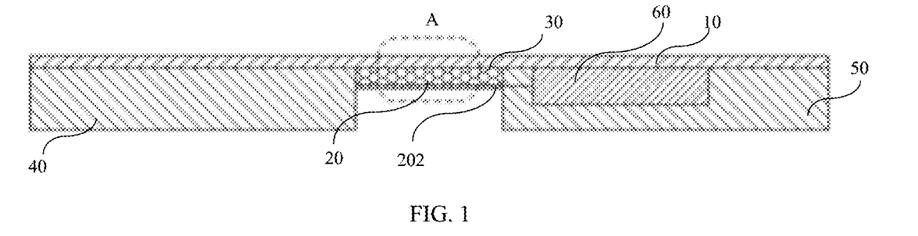
FIG. 1 is a schematic structural diagram of a display apparatus according to an embodiment of the present disclosure.
Figure 2:
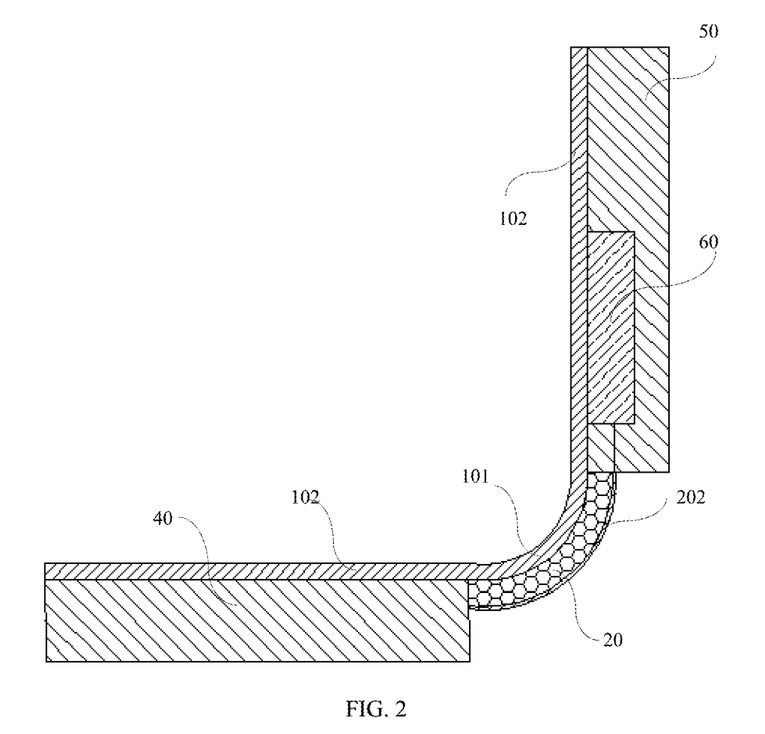
FIG. 2 is a schematic diagram illustrating a bending process of the display apparatus according to an embodiment of the present disclosure.
Figure 3:
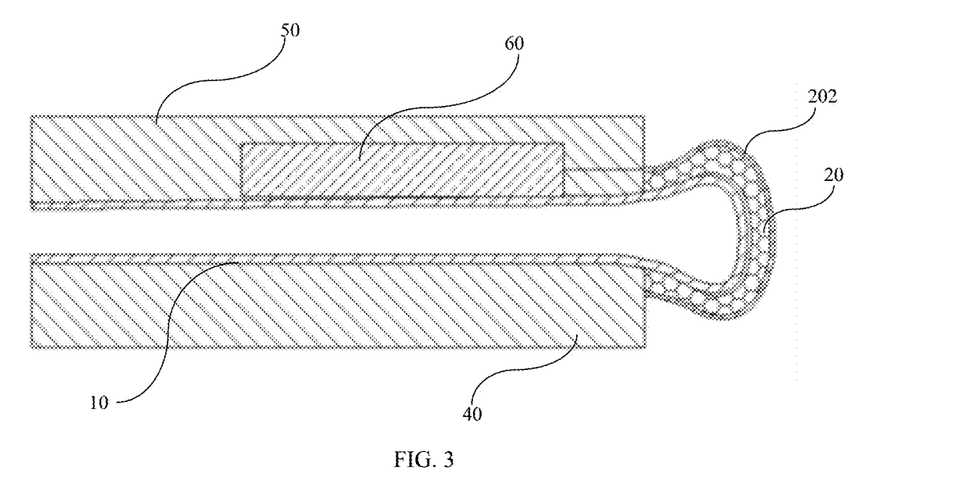
FIG. 3 is a schematic diagram illustrating the display apparatus after bending according to an embodiment of the present disclosure.

The flexible support layer 20 has two states. In one of the states, during the bending process of the flexible display panel, the flexible support layer 20 can be softened, and is bent along with the bent region 101 of the flexible display panel, as shown in FIGS. 2 and 3. In the other state, during the unfolding process of the flexible display panel, the flexible support layer 20 can be hardened to provide support force for the bent region 101. Moreover, there may be a random switch between the two states.

As a feasible embodiment of the flexible support layer 20, the flexible support layer 20 includes a flexible base and a heating layer 202. A plurality of accommodating slots 30 are provided in the flexible base. A magnetic ball 201 is arranged in each of the accommodating slots 30. The heating layer 202 is provided on the flexible base. When the display panel body is in the unfolded state, the heating layer 202 is configured to heat each magnetic ball 201. Each magnetic ball 201 expands with heat, reducing the distance between adjacent magnetic balls, thereby increasing the strength of the display panel body.

The flexible base, as a support component of the flexible support layer 20, has a certain degree of flexibility and hardness. The flexible base can be bent together with the flexible display panel, and can also support the flexible display panel.

Figure 4:
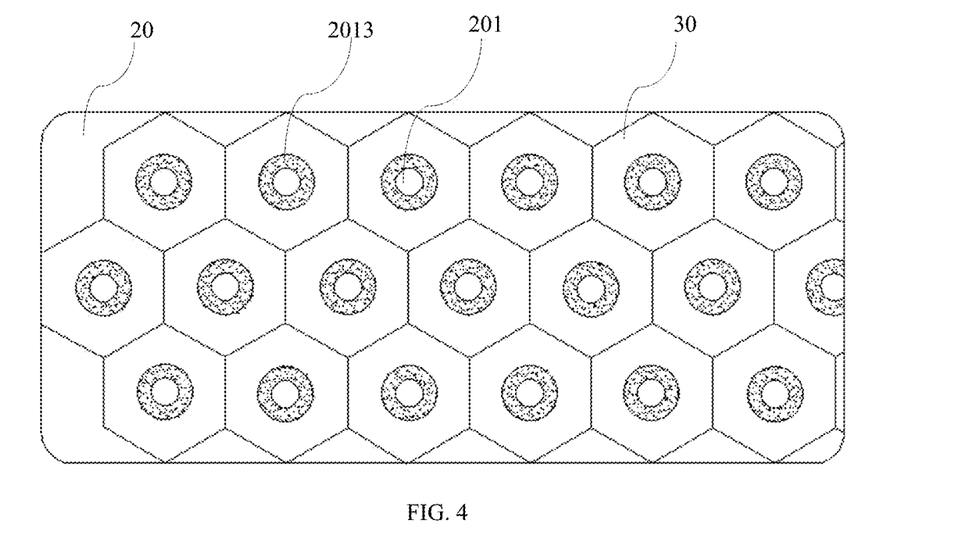
FIG. 4 is an enlarged schematic diagram of region A in FIG. 1.
Figure 5:
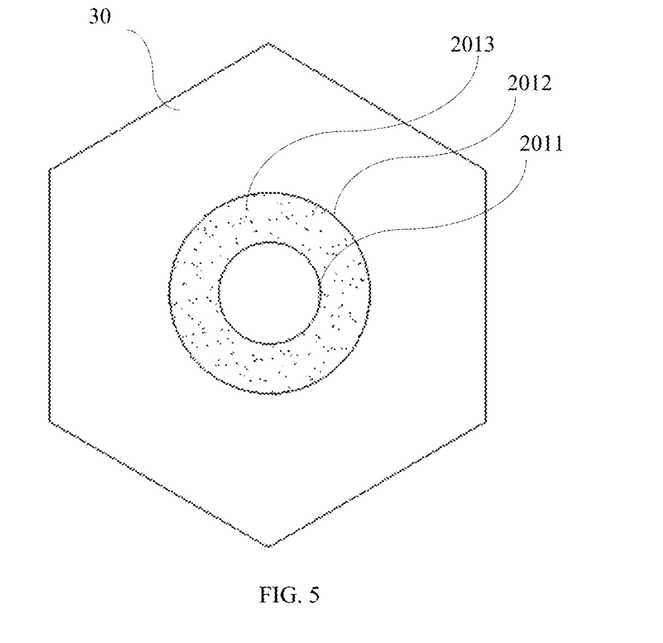
FIG. 5 is a schematic structural diagram illustrating a magnetic ball at room temperature.
Figure 6:
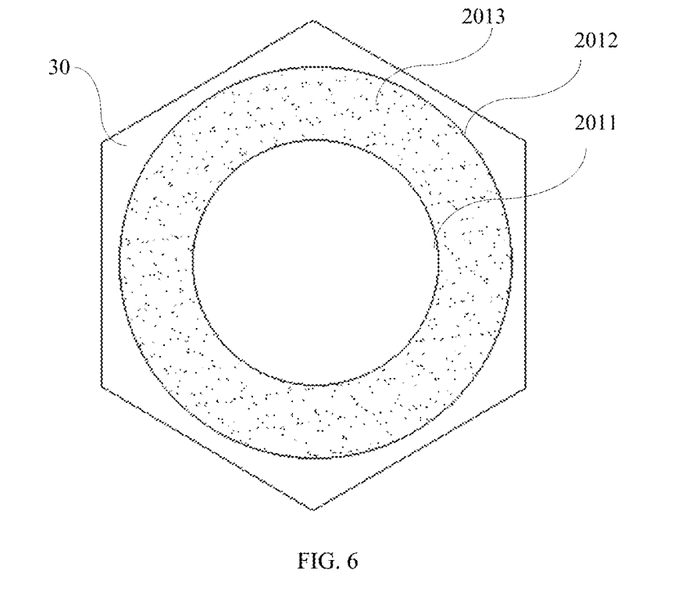
FIG. 6 is a schematic structural diagram illustrating a magnetic ball in a heating state.
Figure 7:
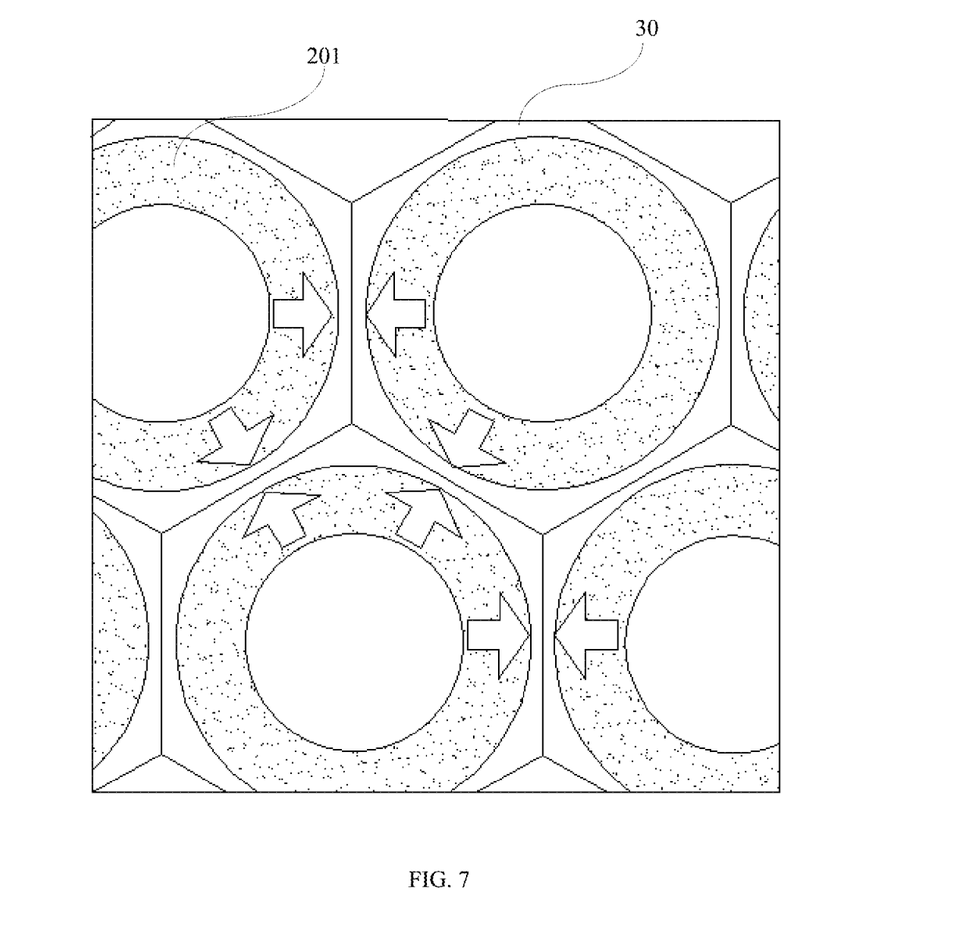
FIG. 7 is a state diagram illustrating a plurality of magnetic balls in a heating state.

A plurality of accommodating slots 30 for placing the magnetic balls are provided in the flexible base. As shown in FIG. 4, FIG. 5 and FIG. 6, the plurality of accommodating slots 30 are respectively provided with one magnetic ball 201. The volume of the magnetic ball 201 is smaller than the volume of the accommodating slot 30. When the flexible display panel is in the bent state, the magnetic ball 201 is generally located close to the center of the accommodating slot 30. On the one hand, adjacent magnetic balls 201 can be separated by the accommodating slot 30 to prevent the magnetic balls 201 from gathering together, so that the hardness of the flexible support layer 20 at room temperature is also higher than the hardness of the display panel body 10, which is not conducive to the bending of the flexible display panel. On the other hand, the magnetic balls 201 have movable space in the accommodating slots 30. When the flexible display panel is in the unfolded state, the heating layer 202 heats the magnetic balls 201, and the magnetic balls 201 expand with heat, so that the volume increases, the distance between adjacent magnetic balls 201 is shortened, and the attractive force between adjacent magnetic balls 201 is increased. In addition, the adjacent magnetic balls 201 can rotate around their own axes during the expanding process, so that the magnetic balls in different directions have opposite polarities, thus the principle that opposites attract is used to make the magnetic balls in different directions attract each other, and the rigidity of the flexible support layer 20 is enhanced. There may be multiple choices for the shape of the accommodating slot 30, such as a circle, an ellipse, or a polygon. In addition, there can be multiple choices for the distribution mode of the accommodating slots 30. For example, the accommodating slots 30 can be randomly arranged on the flexible support layer 20; for another example, the accommodating slots 30 are arranged on the flexible support layer 20 in a honeycomb shape.

However, the structure of the flexible support layer is not limited to the above-mentioned structural form. In order to realize the function of the hardness of the flexible support layer in the unfolded state being greater than the hardness in the bent state, the flexible support layer 20 may be provided with a resin glue with certain fluidity. An active agent is added to the resin glue. In a state of room temperature, the resin glue is in a liquid state, and the flexible support layer 20 has flexibility. In a heated state, the activity of the active agent is activated, so that the molecules in the resin glue are bonded into a whole, and the hardness of the flexible support layer 20 is improved.

In the flexible display panel provided by the embodiments of the present disclosure, the flexible support layer 20 is attached to the shady surface of the bent region 101, so that the flexible support layer 20 and the display panel body 10 form an integral part. When the flexible display panel is bent at a room temperature, the distance between adjacent magnetic balls is large and the magnetic force is small. At this time, the flexible support layer is soft in hardness, which does not affect the bending of the display panel body 10. When the flexible display panel is unfolded, the heating layer 202 heats each of the magnetic balls 201, and each of the magnetic balls 201 expands with heat, so that the hardness of the flexible support layer 20 at this time is greater than the hardness of the flexible support layer 20 when the display panel body 10 is in the bent state. The flexible support layer is used to provide support force for the bent region, so that the display panel body 10 can be flattened. At the same time, since the flexible support layer 20 is arranged to attach to the display panel body 10, the two will not slide relative to each other during the bending and unfolding process, so that the surface of the flexible display panel is always in a flat state to avoid wrinkles of the flexible display panel, thereby improving the display effect of the flexible display panel. In addition, the attached arrangement between the bent region 101 and the flexible support layer 20 may also prevent dust from entering between the bent region 101 and the flexible support layer 20 to affect the light-emitting performance of the flexible display panel.

In a feasible embodiment, the magnetic ball includes an elastic sphere and magnetic powder 2013 distributed in the elastic sphere. The elastic sphere can be a silica gel sphere or a sponge sphere whose surface is subjected to airtight treatment. The elastic sphere has an expansion and contraction property. When the heating layer 202 heats the flexible base, the elastic sphere can expand with heat, shortening the distance between adjacent elastic spheres, and increasing the hardness of the flexible base by using the attractive force between the magnetic powder.

In a feasible embodiment, the elastic sphere is a hollow sphere, and the magnetic powder 2013 is located between the inner surface and the outer surface of the hollow sphere.

The hollow ball has an inner surface 2011 and an outer surface 2012 that are arranged at intervals. The inner surface 2011 constitutes the hollow region of the hollow sphere, and the magnetic powder 2013 is provided in the area enclosed between the inner surface 2011 and the outer surface 2012. In the process of preparing the hollow spheres, the rubber material can be mixed with the magnetic powder, and then the hollow spheres can be prepared by injection molding.

The hollow region of the hollow sphere is filled with air. This is because the air has better expansion and contraction ability than silica gel. When the hollow sphere is heated, the air would quickly expand with heat, which has a certain driving force on the inner surface 2011 of the hollow sphere so that the volume of the hollow elastic sphere is increased rapidly and the accommodating slot 30 is filled. Furthermore, the distance between adjacent hollow spheres is reduced, and the magnetic powder attracts each other to attract the adjacent hollow spheres together, thereby increasing the overall strength of the flexible support layer 20, thereby providing support force for the bent region 101.

The structure of the hollow sphere is not limited to the above-mentioned way. In one embodiment, the hollow sphere includes an inner housing and an outer housing sheathed on the inner housing, an accommodating space is formed between the outer housing and the inner housing, and the accommodating space is filled with a magnetic structure. The magnetic structure can be a large-diameter magnet block, which can increase the attractive force between adjacent hollow spheres. In this way, even at a lower heating temperature, the flexible support layer 20 can quickly harden, to shorten the hardening time of the flexible support layer 20, and provide support force for the bent region 101.

As a preferred embodiment of the arrangement of the accommodating slots, the accommodating slots 30 are arranged on the flexible support layer 20 in a honeycomb shape. In this way, it is possible to avoid both a case that a support function cannot be achieved due to an excessively small hardness of the flexible support layer 20 while a touch-enabled function can not be achieved due to downward depression and deformation of the flexible display panel under stress during a touch operation when the flexible display panel is unfolded, and a case that the bendability of the flexible display panel can not be achieved due to an excessively large hardness of the flexible support layer 20 which, when being bent, would stretch and squeeze the bent region 101 so that the flexible display panel can not be bent.

In a feasible embodiment, the flexible base may be a foam layer or a rubber layer. Preferably, the flexible base is a foam layer, the foam layer has certain pores, and the magnetic balls 201 can be directly arranged in the pores, which is convenient for the processing and preparation of the flexible base. In addition, the pores of the foam layer have both compression and stretching functions. In the microscopic state, when the flexible display panel is bent, the pores of the foam layer can be slightly convex outward in the direction away from the bent region 101, which can provide a small space for the bending of the bent region 101, facilitating the bending of the bent region 101, ensuring that the flexible support layer 20 would not squeeze the bent region 101 to damage the flexible display panel.

In addition, there may be multiple foam layers, and the multiple foam layers can be stacked in sequence to form the flexible base. Each foam layer can be provided with the accommodating slots 30, or a certain foam layer or two foam layers may be provided with the accommodating slots 30. Therefore, the arrangement of the accommodating slots 30 can be designed according to the hardness required by the flexible support layer 20, which is not specifically limited in this embodiment.

When each foam layer is provided with the accommodating slots 30, the arrangement of the accommodating slots 30 on each foam layer may be the same or different. Adjacent foam layers can be connected by adhesive, which can ensure the strength of the flexible support layer 20 and facilitate the processing.

As a preferred embodiment of the heating layer 202, the heating layer 202 includes an electric heating wire. The electric heating wire is bonded to the flexible base, and an insulating layer is provided outside the electric heating wire. The electric heating wire generates heat when being electrified, and the temperature of the magnetic balls 201 is increased, so that the magnetic balls 201 expand with heat, and the distance between adjacent magnetic balls 201 is shortened. An insulating layer for covering the electric heating wire is provided outside the electric heating wire to prevent the electric heating wire from being exposed to the air, which reduces the safety performance. In addition, the electric heating wire can be powered by an external power supply device, for example, the power supply device can be a power supply module 60 in a mobile phone or a computer.

In a feasible embodiment, the number of non-bent regions 102 is two, and the two non-bent regions are symmetrically distributed on both sides of the bent region to increase the display region of the flexible display panel, but other structural forms are not excluded. For example, the number of non-bent regions can also be three, and for the flexible display panel, sequentially there may be a non-bent region, a bent region, a non-bent region, a bent region, and a non-bent region from left to right.

In a feasible embodiment, at least one end of the flexible support layer 20 has an extending portion, and the extending portion is attached to the non-bent region 102. In order to increase the support force of the flexible support layer 20, the area of the flexible support layer 20 may be larger than the area of the bent region 101. There are many options for the arrangement of the extending portion. For example, one end of the flexible support layer 20 may have an extending portion, and the extending portion is attached to a part of one of the non-bent regions 102. Or, the extending portion is attached to an entirety of one of the non-bent regions 102. For another example, both the left and right ends of the flexible support layer 20 may have extending portions, so that the extending portions can be attached to the two non-bent regions 102 to increase the support force for the flexible display panel. The extending portion may extend along the length direction of the display panel body 10, and the width of the flexible support layer 20 may be equal to the width of the flexible display panel. In addition, the structure and function of the extending portion may be the same as or different from the structure and function of the flexible support layer 20, which is not specifically limited in this embodiment.

An embodiment of the present disclosure further provides a flexible display apparatus, including the flexible display panel as described above, and a first housing 40 and a second housing 50 provided on the shady surface of the flexible display panel. There is a gap between the first housing 40 and the second housing 50, and the gap is configured to accommodate the flexible support layer 20. The first housing 40 and the second housing 50 may provide a bearing component for the flexible display panel, and may also provide installation space for other components of the flexible display apparatus. The power supply module 60 of the flexible display apparatus is arranged in the first housing 40 or the second housing 50, and the power supply module 60 is electrically connected with the electric heating wire to provide power for the electric heating wire to make the electric heating wire generate heat.

In the description of the present disclosure, the orientational or positional relationship is based on the orientational or positional relationship shown in the drawings, which is used only for the convenience of describing the present disclosure and simplifying the description, but does not indicate or imply that the indicated device or element must have a specific orientation, be configured and operate in a specific orientation. Therefore, it cannot be interpreted as a limitation to the present disclosure.

In the present disclosure, unless otherwise clearly stipulated and defined, the terms "installed", "coupled", "connected", "fixed" and other terms should be understood in a broad sense, for example, it may be a fixed connection, or a detachable connection, or one-piece; it can be a mechanical connection, or an electrical connection, or a mutual communication; it can be a direct connection, or an indirect connection through an intermediary, or an internal communication inside two elements, or an interaction relationship between two elements, unless otherwise clearly defined. For those of ordinary skill in the art, specific meanings of the above-mentioned terms in the present disclosure can be understood according to specific circumstances.

Finally, it should be noted that the above embodiments are only used to illustrate the technical solutions of the present disclosure, but not to limit it; although the present disclosure has been described in detail with reference to the foregoing embodiments, those of ordinary skill in the art should understand that, they may make modifications to the technical solutions described in the foregoing embodiments, or equivalently replace some or all of the technical features therein; and these modifications or replacements do not cause the essence of the corresponding technical solutions to deviate from the scope of technical solutions in the embodiments of the present disclosure.

What is claimed is:

1. A flexible display panel, comprising: a display panel body comprising a bent region and a non-bent region connected to the bent region; and a flexible support layer attached to a shady surface of the bent region, and comprising a flexible base and a heating layer, the flexible base having a plurality of magnetic balls arranged therein; wherein the heating layer is provided on the flexible base for heating the magnetic balls, and each of the magnetic balls expands with heat, to enable a hardness of the flexible support layer when the display panel body is in an unfolded state to be greater than a hardness of the flexible support layer when the display panel body is in a bent state.

2. The flexible display panel according to claim 1, wherein the flexible base has a plurality of accommodating slots provided therein, and each of the accommodating slots is provided with one of the magnetic balls.

3. The flexible display panel according to claim 2, wherein when the display panel body is in the unfolded state, the heating layer heats the magnetic balls, and the hardness of the flexible support layer when the display panel body is in the unfolded state is greater than the hardness of the flexible support layer when the display panel body is in the bent state.

4. The flexible display panel according to claim 2, wherein the magnetic ball comprises an elastic sphere and magnetic powder distributed in the elastic sphere.

5. The flexible display panel according to claim 4, wherein the elastic sphere is a silica gel sphere or a sponge sphere whose surface is subject to airtight treatment.

6. The flexible display panel according to claim 4, wherein the elastic sphere is a hollow sphere, and the magnetic powder is located between an inner surface and an outer surface of the hollow sphere.

7. The flexible display panel according to claim 6, wherein a hollow area of the hollow sphere is filled with air.

8. The flexible display panel according to claim 4, wherein the plurality of accommodating slots are arranged in the flexible base in a honeycomb shape.

9. The flexible display panel according to claim 4, wherein the flexible base is a foam layer or a rubber layer.

10. The flexible display panel according to claim 9, wherein there are multiple foam layers, the multiple foam layers are stacked in sequence, and at least one or each foam layer is provided with the plurality of accommodating slots.

11. The flexible display panel according to claim 2, wherein when the flexible display panel is in the bent state, the magnetic ball is located close to a center of the accommodating slot.

12. The flexible display panel according to claim 1, wherein the magnetic ball comprises an elastic sphere, the elastic sphere is a hollow sphere, and the hollow sphere comprises an inner housing and an outer housing sheathed on the inner housing, an accommodating space is enclosed between the outer housing and the inner housing, and the accommodating space is filled with a magnetic structure.

13. The flexible display panel according to claim 1, wherein the heating layer comprises an electric heating wire, the electric heating wire is bonded to the flexible base, and an insulating layer covering the electric heating wire is provided outside the electric heating wire.

14. The flexible display panel according to claim 1, wherein the non-bent regions are two in number, which are symmetrically distributed on both sides of the bent region.

15. The flexible display panel according to claim 1, wherein at least one end of the flexible support layer has an extending portion, and the extending portion is attached to the non-bent region.

16. The flexible display panel according to claim 15, wherein the extending portion is attached to a part of the non-bent region or an entirety of the non-bent region.

17. A flexible display apparatus, comprising the flexible display that comprises a display panel body comprising a bent region and a non-bent region connected to the bent region; and a flexible support layer attached to a shady surface of the bent region, and comprising a flexible base and a heating layer, the flexible base having a plurality of magnetic balls arranged therein; wherein the heating layer is provided on the flexible base for heating the magnetic balls, and each of the magnetic balls expands with heat, to enable a hardness of the flexible support layer when the display panel body is in an unfolded state to be greater than a hardness of the flexible support layer when the display panel body is in a bent state, and a first housing and a second housing provided on the shady surface of the flexible display panel, wherein there is a gap between the first housing and the second housing, and the gap is configured to accommodate the flexible support layer.

18. The flexible display apparatus according to claim 17, wherein a power supply module is provided in the first housing or the second housing, and the power supply module is electrically connected to an electric heating wire.

* * * * *